United States Patent [19]

Okubo et al.

[11] Patent Number: 4,703,143
[45] Date of Patent: Oct. 27, 1987

[54] WIRE EDM METHOD FOR PREVENTING WIRE LAGGING DURING MACHINING OF AN ANGULAR CORNER AND WORKPIECE POSITION CONTROL

[75] Inventors: Yasumi Okubo, Sagamihara; Asami Morino, Kanagawa, both of Japan

[73] Assignee: Amada Company, Limited, Japan

[21] Appl. No.: 811,368

[22] Filed: Dec. 20, 1985

[30] Foreign Application Priority Data

Dec. 25, 1984 [JP] Japan .................. 59-271689
Jan. 30, 1985 [JP] Japan .................. 60-014382

[51] Int. Cl.$^4$ .................. B23H 7/06; G05D 15/00
[52] U.S. Cl. .................. 219/69 W; 219/69 R; 219/69 M; 318/646
[58] Field of Search .......... 219/69 S, 69 M, 69 W, 219/69 R; 364/474, 475; 318/646, 685; 204/224 M, 206

[56] References Cited

U.S. PATENT DOCUMENTS

| | | | |
|---|---|---|---|
| 3,609,486 | 9/1971 | Feldhoff et al. | 318/646 |
| 3,809,488 | 5/1974 | Sonderegger | 318/646 |
| 4,324,970 | 6/1980 | Nanasawa et al. | 219/69 M |
| 4,362,980 | 12/1982 | Itzkowitz | 318/685 |
| 4,467,166 | 8/1984 | Gamo et al. | 219/69 W |
| 4,499,359 | 2/1985 | Obara | 219/69 W |
| 4,506,133 | 3/1985 | Inoue | 219/69 R |
| 4,518,842 | 5/1985 | Obara | 219/69 W |
| 4,521,662 | 6/1985 | Kinoshita et al. | 219/69 W |
| 4,542,467 | 9/1985 | McMurtry | 364/474 |
| 4,559,434 | 12/1985 | Kinoshita | 219/69 W |
| 4,559,601 | 12/1985 | Kishi et al. | 219/69 W |
| 4,564,912 | 1/1986 | Schwefel | 364/474 |
| 4,617,635 | 10/1986 | Shimizu | 364/474 |
| 4,626,645 | 12/1986 | Inoue et al. | 219/69 M |

FOREIGN PATENT DOCUMENTS

| | | | |
|---|---|---|---|
| 84735 | 8/1983 | European Pat. Off. | 219/69 M |
| 93026 | 11/1983 | European Pat. Off. | 219/69 S |
| 54-39297 | 3/1979 | Japan | 219/69 W |
| 57-66827 | 4/1982 | Japan | 219/69 W |
| WO82/02164 | 7/1982 | PCT Int'l Appl. | 219/69 W |

Primary Examiner—A. D. Pellinen
Assistant Examiner—Geoffrey S. Evans
Attorney, Agent, or Firm—Wigman & Cohen

[57] ABSTRACT

A machining control method for an electrical discharge machine compensates for the lagging of the wire electrode as the electrode is advanced from a straight line portion to a change of direction portion of the outline to be machined. The wire electrode is advanced from the straight line portion of the outline until it reaches the change of direction point of the outline and is then halted until the wire electrode lag is corrected. During the halt, machining takes place under a different set of conditions. When the lag is corrected, the wire electrode is advanced along the change of direction portion under a third set of machining conditions. When the wire electrode reaches another straight line portion, the outline machining of the workpiece is resumed under the first set of machining conditions. Also disclosed is a method of controlling the positioning of a workpiece by trial positioning a large number of workpieces having a variety of weights under a variety of load conditions of the control motor. The positioning accuracy of the trial positionings are measured and a table of correction values for positioning according to the desired positioning is calculated and stored. When positioning a workpiece to be machined, the weight and motor load are compared to the stored correction values, a correction value is determined, and the workpiece is positioned using the determined correction value.

10 Claims, 5 Drawing Figures

WIRE EDM METHOD FOR PREVENTING WIRE LAGGING DURING MACHINING OF AN ANGULAR CORNER AND WORKPIECE POSITION CONTROL

BACKGROUND OF THE INVENTION

1. Field of the Invention

This invention relates to a method for controlling a wire cut electrical discharge machine tool in which a workpiece is cut along an outline. More specifically, it relates to a machining control method which makes it possible to accurately machine corners in the outline, without producing detours in the machining outline.

2. Description of the Prior Art

In general, a wire cut electrical discharge machine tool has a worktable which supports the workpiece and a wire electrode guide arranged vertically above and below the workpiece. In a wire cut electrical discharge machine tool, either the work table or the wire electrode guide (or both) moves horizontally along the X-axis and the Y-axis to cut the workpiece along a predetermined outline. The motion of the worktable or wire electrode guide along the X-axis or Y-axis is controlled by a suitable control device such as a computer or numerical control device. The outline along which the workpiece is to be cut and various machining conditions are programmed prior to machining and stored in the control device memory.

In a wire cut electrical discharge machine tool with the said component parts, it is known that when wire cut electrical discharge machining is performed the reaction force due to an electrical discharge causes the machining sections of the wire electrodes to bend in the direction opposite to that in which the machining is proceeding. That is to say, in a wire cut electrical discharge machine tool, when an electrical discharge occurs it is difficult to avoid being bending of the wire electrodes due to the reaction force. Even if the wire guide follows the outline accurately, the actual position of the wire electrodes during machining lags in the direction in which the machining is proceeding.

Consequently, when a corner in the outline is machined, the wire electrode follows the guide along a detoured inner path as in the relation between the front and rear wheels of an automobile. Deviation from the accurate outline is produced at the corners of the outline which are machined as rounded rather than sharp corners, reducing the machining accuracy.

In addition, when machining is being done along a straight line section of the outline, since the areas which are machined per unit time on the left and right sides of the centers of the wire electrodes are equal, the wire electrodes are bent only on the side that is retarded in the direction of advance of the wire electrodes. However, at an angular change of direction point, when the direction in which the machining is proceeding is changed, the right and lift machined areas in front of the advance of the wire electrodes become unequal, so that the wire electrodes are bent toward the direction in which less machining is taking place. Wire electrode bending of this type also contributes toward lowering the machining accuracy at angular corners of the outline.

In order to solve the problem described above and reduce the amount of wire electrode bending, the tension on the wire electrodes has been increased as much as possible, and the distance between the upper and lower wire electrode guides has been made as short as possible. By such means the amount of wire electrode bending can indeed be reduced. However, such means cannot reduce the amount of wire bending to zero and therefore are not really satisfactory.

SUMMARY OF THE INVENTION

The first object of this invention is to provide a means of control which will make it possible to machine the angular corners of outlines to high accuracy when electrical discharge machining of a workpiece along an outline is performed.

The second object of this invention is to provide a means of control that will enable machining to be performed without the wire electrodes lagging behind the part that is actually being machined when machining is done at an angular corner of an outline.

In order to achieve the objectives described above, in this invention, when electrical discharge machining of a workpiece is performed in accordance with a preset program for the outline along which the workpiece is to be cut, control is applied to a machining process which proceeds in four stages. In the first stage, until the wire electrode guides reach a change of direction point at an angular corner of the said cutting outline, machining is done according to the normal first condition. In the second stage, the centers of the wire electrode guides reach the programmed change of direction point, and at the same time the relative motion between the wire electrode guides and the workpiece in the direction of the cutting contour stops. Machining is performed in accordance with the second machining condition, in such a manner that the electrical discharge gap between the wire electrodes and the workpiece remains the same as in the first machining condition. In the third stage, after the wire electrodes have reached the change of direction point on the cutting outline, electrical discharge machining is started along the cutting contour in accordance with the third machining condition, in such a manner that the amount of bonding of the wire electrodes is less than the amount of bending when machining is done in accordance with the first machining condition. In the fourth stage, in the relative motion between the wire electrodes and the workpiece, when the left and right machining conditions in front of the wire electrodes in the direction of advance become identical, the machining condition is changed to the first machining condition.

The third object of this invention is to provide a control method which permits a moving object such as the work table to be positioned accurately as it moves.

In order to attain this objective, in this invention the weight of the object being moved and the load on the drive system which drives the object being moved are measured beforehand, positioning accuracies corresponding to weights of objects being moved and loads on the drive system are measured and corrections determined beforehand, a large number of such corrections corresponding to weights of objects being moved and loads on the drive system are stored in the control device memory beforehand, the correction corresponding to the weight of the object presently being moved and to the present load on the drive system is selected from the memory, and, based on this selected correction, the position of the object being moved is corrected when its motion stops.

DESCRIPTION OF THE PREFERRED EMBODIMENTS

Figure 1:
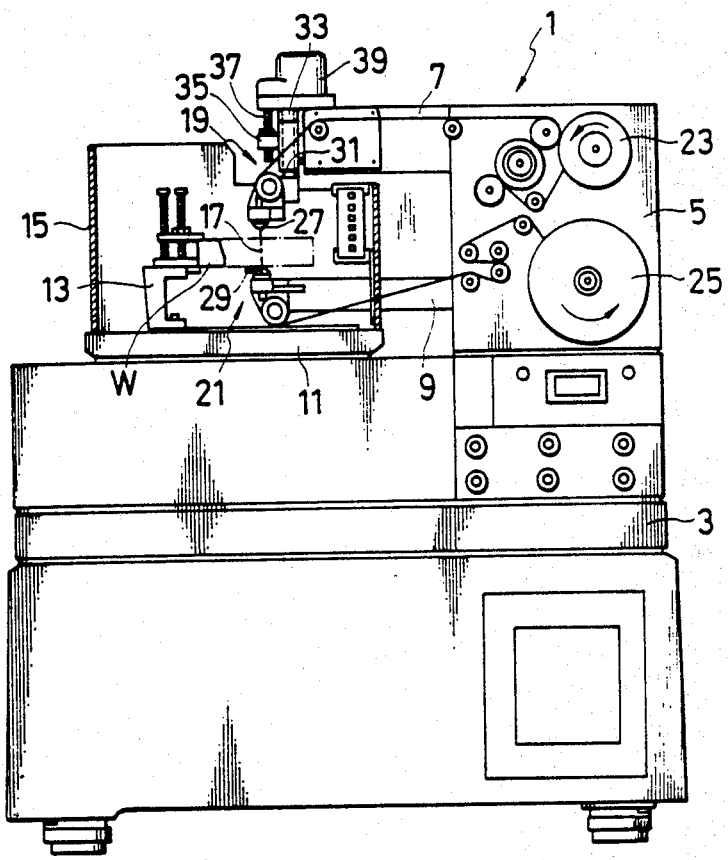
FIG. 1 is a side elevation of one section of a wire cut electrical discharge machine tool.

Referring to FIG. 1, the wire cut electrical discharge machine tool 1 has a base 3, a column 5 which stands on one side the base 3, and an upper arm 7, and a lower arm 9 which are attached to the upper and lower parts of column 5. On the said base 3 is a worktable 11 which is arranged to be driven horizontally along an X-axis and a Y-axis by a control motor such as a stopping motor (not shown in the figure). On worktable 11 is a work support post 13 which supports the workpiece W to be machined. Also on the worktable 11 is a cover 15 which encloses the work support post 13.

The thin wire electrode 17 which is to perform electrical discharge machining of workpiece W is held in vertical positions above and below the workpiece W by the wire electrical guides 19 and 21. Guides 19 and 20 are mounted on the tips of the upper arm 7 and the lower arm 9 vertically opposite each other.

The said wire electrode guides 19 and 21 act so as to guide the said wire electrode 17 vertically. Wire electrode 17 is supplied continuously from the supply reel 23, which is mounted on the said column 5 so that it is free to rotate, to the takeup reel 25. On these wire electrode guides 19 and 21 are mounted nozzles 27 and 29 which supply machining fluid to the point on the workpiece W where electrical discharge machining is taking place.

In a wire cut electrical discharge machine tool 1 with a configuration such as that described above, by causing electrical discharges to take place between the vertical part of the wire electrode 17 which is guided by the upper and lower wire electrode guides 19 and 21 and the workpiece W, electrical discharge machining of the workpiece W is performed.

In this embodiment, by moving the worktable 11 in the X and Y directions under the control of a control device as the electrical discharge machining proceeds, the workpiece W is cut along a predetermined outline.

Removal of the scrap produced by the electrical discharge machining, cooling of the part of the workpiece W being machined, and cooling of the wire electrode 17 are done by machining fluid ejected from the nozzles 27 and 29 which are mounted on the wire electrode guides 19 and 21.

In performing electrical discharge machining of a workpiece W, the upper wire electrode guide 19 is mounted so that it can move up and down freely, so that the workpiece W can be easily attached to and removed from the work support post 13 and so that workpieces W of various thicknesses can be accomodated. More specifically, a raising and lowering rod 31 which supports the said nozzle 27 is mounted on the upper wire electrode guide 19. This raising and lowering rod 31 is supported and guided by the guide plate 33, which is attached to the tip of the upper arm 7, so that it is free to move up and down. In addition, the said receiving and lowering rod 31 is slidingly attached to the nut member 35 which is screwed into the vertical threaded rod 37. The threaded rod 37 is coupled to a suitbale servomotor 39 which is attached to the tip of the upper arm 7.

Consequently, by driving the servomotor 39 by an appropriate amount, the threaded rod 37 is rotated and the wire electrode guide 19 is moved up and down. Therefore, the wire electrode guide 19 can be raised above the upper surface of the workpiece W, so that there is not interference with attaching the workpiece to or removing it from the work support post 13. Also, the position of the wire electrode guide 19 can be adjusted to correspond to the thickness of the workpiece W, and the gap between the upper and lower nozzles 27 and 29 can be kept as small as possible.

As has been made clear above, in a wire cut electrical discharge machine tool, by causing electrical discharges to occur between the vertical part of the wire electrode 17 and the workpiece W, wire cut electrical discharge machining of the workpiece W is performed. When an electrical discharge is made to occur between the wire electrode 17 and the workpiece W, an electrical discharge gap G is formed between the wire electrode 17 and the workpiece W. In addition, when electrical discharge machining of the workpiece W is performed, the wire electrode guides 19 and 21 and the wire electrode 17 are moved relative to the workpiece W in accordance with a program stored in the memory of a control device such as a numerical control device.

Figure 2:
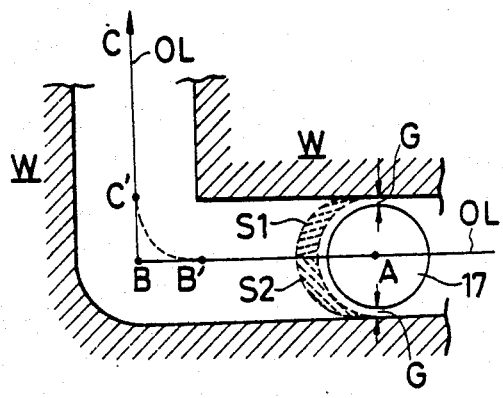
FIGS. 2 and 3 are schematic diagrams of the detour produced at the corner in a path of the electrode of an electric discharge machine.

As shown in FIG. 2, when electrical discharge machining of a workpiece W is done along a straight line portion of the outline along which the workpiece W is to be cut, the areas $S_1$ and $S_2$ per unit of time which are machined to the left and right in front of the advance of the machining by the wire electrode 17 have left-right symmetry with respect to the direction in which the machining proceeds. Consequently, the reaction force to the electrical discharge that occurs when these machined areas $S_1$ and $S_2$ are machined causes the wire electrode 17 to be bent so that its advance in the direction in which the machining proceeds is retarded; bends to the left and right of the direction in which the machining proceeds cancel each other out.

When the wire electrode is bent as explained above, when the wire electrode guides 19 and 21 are positioned relative to the workpiece W in the cause of machining around a corner in the outline, laziness occurs at the corner, and the corner is rounded. That is to say, referring to FIG. 2, when the wire electrode guides 19 and 21 pass from point A on the straight part of the outline to the change of direction point B at the corner, the position that the wire electrode 17 is actually machining is at point B', retarded with respect to the direction of advance. Consequently, when the position of the wire electrode guides 19 and 21 advances from point B' to point B in the direction toward point C, the wire electrode 17 cuts the corner, following the path shown by the dotted line B'C', causing the corner of the workpiece W to be rounded.

In this invention, when the wire electrode guides 19 and 21 are positioned at the change of direction point B at the corner of the outline, the relative motion of the wire electrode guides 19 and 21 is temporarily halted until the wire electrode 17 becomes unbent and reaches the change of direction point B. After the wire electrode 17 becomes unbent, machining resumes from the change of direction point B in the direction of point C'.

During the time it takes for the wire electrode 17 to become unbent at the change of direction point B as described above, the machining condition is changed from the first machining condition to the second machining condition so that the electrical discharge gap between the workpiece W and the wire electrode 17 is kept equal to the electrical discharge gap when the straight line part of the outline is machined. That is to say, for example the pulse width, interval and peak current of the pulse voltage applied to the electrical discharge gap are varied in a suitable manner so as to reduce the drop in machining accuracy at the corner of the outline as much as possible.

At the change of direction point B on the outline, detection of whether or not the wire electrode 17 has become fully unbent is done, for example, by detecting the state of the electrical discharge gap. That is to say, by detecting that an electrical discharge does not occur in the electrical discharge gap even when a pulse voltage is applied, it can be determined that the wire electrode 12 has become fully unbent. When the wire electrode 17 has become fully unbent as described above, the wire electrode 17 is held vertically by the wire electrode guides 19 and 21, and is positioned at the change of direction point B of the outline.

Figure 3:
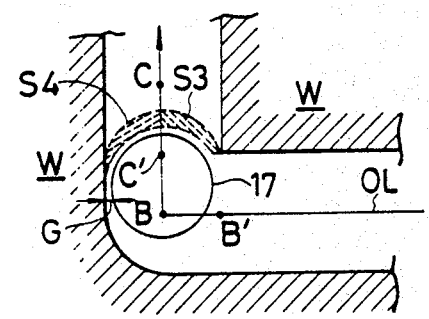

After the wire electrode 17 has been positioned at the change of direction point B on the outline as described above, then, as shown in FIG. 3, machining resumes in the direction of point C'. At this time, the left and right machined areas S$_3$ and S$_4$ per unit of time in front of the direction in which machining by the wire electrode 17 is proceeding possesses left-right asymmetry with respect to the direction in which the machining is advancing. Consequently, the reaction force which the wire electrode 17 receives when electrical discharge machining of the machined areas S$_3$ and S$_4$ is performed is asymmetrical, and the wire electrode 17 bends toward the side of the smaller machined areas. Therefore the machining accuracy of the corner of the outline drops.

In this invention, at the time when machining resumes in the direction from the change of direction point B toward the point C' as described above, the machining condition is changed to the third machining condition, the pulse voltage pulse width, interval and peak current are suitably controlled to keep the wire electrode 17 feed rate in the direction of advance of machining (the machining rate) substantially slower than the feed rate when machining was done on the straight line part at point A and to suppress the bending of the wire electrode 17.

After that, when the left-right machined areas S$_3$ and S$_4$ have come into left-right symmetry with respect to the direction of advance of the wire electrode 17, the machining condition is changed to the first machining condition that was in effect at point A. At the time when the machining condition is changed from the third machining condition to the first machining condition as explained above, the wire electrode 17 has traveled a distance L from the change of direction point B.

Figure 4:
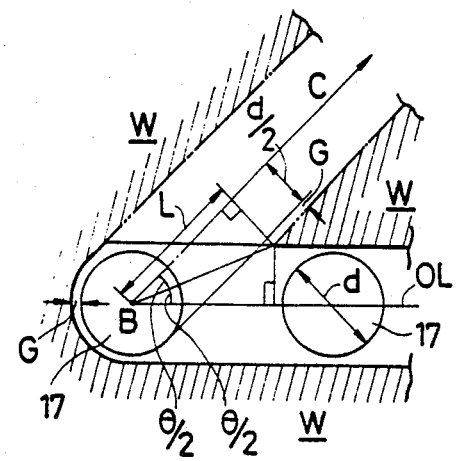
FIG. 4 is a schematic diagram illustrating machining at a corner having an additional angle.

As can be seen from FIG. 4, the said distance L is given by the following formula, where d is the diameter of the wire electrode 17, G is the electrical discharge gap and O is the angle of the corner:

$$L = (d/2 + G)/\tan(\theta/2)$$

Consequently, the point at which the machining condition is to be changed from the third machining condition to the first machining condition can be set beforehand.

As can be understood from the above explanation, during electrical discharge machining of a workpiece W performed along an outline, when a corner of the outline is machined, first the straight line part is machined under the first machining condition. Next, the machining condition is changed to the second machining condition, and the wire electrode 17 stops moving in the direction in which machining is proceeding until the wire electrode 17 reaches the change of direction point at the corner. After that, the machining condition is changed to the third machining condition and machining resumes along the outline, so that machining is done accurately without occurrence of "laziness".

However, in a wire cut electrical discharge machine tool, when for example a progressive die is machined, in which the machine is equipped with a wire electrode cutting device and an automatic wiring device, it is necessary to perform machining at several locations on the workpiece automatically and continuously. In this case, initial holes are drilled at several locations on the workpiece beforehand, and it becomes necessary to accurately position the wire electrode guides at these initial holes in order to pass the wire electrode through these initial holes.

When it is necessary to position the workpiece accurately as in the case described above, it is desirable for the method of positioning the worktable 11 which supports the workpiece described below to be employed.

Figure 5:
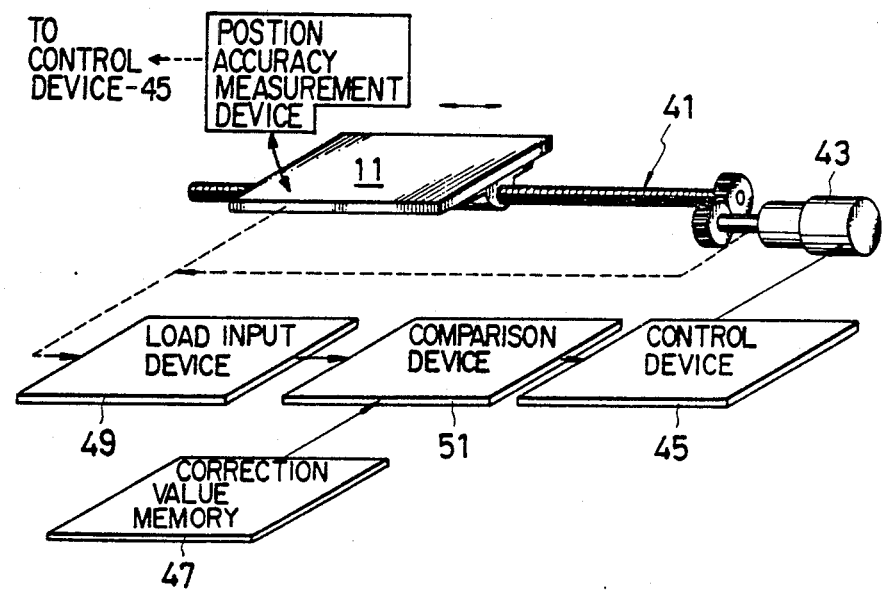
FIG. 5 is a block diagram illustrating the control system for positioning the work table in accordance with the invention.

Referring to FIG. 5, when the worktable 11, which is the object being moved, is to be moved by the driving of a control motor 43 through a suitable mechanism, for example the ball screw mechanism 41, the control motor 43 is connected to a suitable control device 45 such as a computer or numerical control device which can provide suitable control for the control motor 43. A correction value memory 47, load input device 49 and comparison device 51 are connected to this control device 45.

The said correction value memory 47 stores stop position correction values corresonding to the weight of the workpiece which rests on the worktable 11 and the load on the control motor 43. The said stop position correction values are determined beforehand by loading a number of workpieces of different weights on the worktable 11 and measuring the positioning accuracy in each case. When the workpieces are changed in succession and the positioning accuracies measured, the load on the control motor 43, as indicated for example by the effective current, is also measured in each case.

Consequently, by measuring the weight of several workpieces and the load on the control motor, the corresponding position correction value can be easily determined.

The said load input device 49 is for input of the weight of the workpiece loaded on the worktable 11. This load input device 49 could be a manual input device such as a keyboard, or it could be a suitable automatic measurement device which automatically measures the weight of the workpiece on the worktable 11. The load input device 49 could also be a device which automatically measures the load on the control motor 43.

The said comparison device 51 compares the weight of the workpiece input from the load input device 49, or the load on the control motor 43, with previous input values and selects a stop position correction value from the said connection value memory 49 that corresponds to the input value of the weight or load, or to a previously stored value that approximates it.

The said control device 45 adds the stop position correction input from the comparison device 51 to, or subtracts it from, the stop position in the stop command in order to control the control motor 43 so that the worktable 11 is stopped in the desired position.

As is already understood from the above explanation, when a workpiece is loaded on the worktable 11, the weight of that workpiece is input to the load input device 49, or, alternatively, the weight of the workpiece is measured and fed to the comparison device 51. In the comparison device 51, a correction value stored in the correction value memory 47 that corresponds to a workpiece weight or load on the motor 43 that equal or approximates the input value is selected and fed to the control device 45. The control device 45, based on the given correction value, controls the control motor 43 so that the worktable 11 will be stopped in an accurate position.

Consequently, when an initial hole in the workpiece loaded on the worktable 11 is positioned in a position corresponding to the wire electrode guides, the positioning can be performed accurately so that the wire electrode can be inserted smoothly into the initial hole.

In the embodiment shown in FIG. 5, the case in which positioning is done by moving the worktable is explained with a one-dimensional model. However, the applicability of the method used in this embodiment is not limited to wire cut electrical discharge machine tools, but can also be applied to movement positioning control of the moving parts of various other devices such as the worktables in other types of machine tool, machining heads, tool holders, etc.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A machining control method for electrical discharge machining of a workpiece in which a pair of wire electrode guides for guiding a wire electrode are advanced relative to said workpiece along a predetermined outline having a first straight line portion, a change of direction point, a second straight line portion, and a third straight line portion in accordance with a set of predetermined machining parameters comprising the steps of:
   (a) advancing said wire electrode guides relative to said workpiece along the first straight line portion of said outline while machining said workpiece according to a first set of predetermined machining parameters;
   (b) halting the advance of said wire electrode guides relative to said workpiece when said wire electrode guides reach the change of direction point of said outline and machining said workpiece according to a second set of predetermined machining parameters;
   (c) advancing said wire electrode guides relative to said workpiece along the second straight line portion of said outline while machining said workpiece according to a third set of predetermined machining parameters; and
   (d) resuming the advance of said wire electrode guides while machining said workpiece according to said first set of predetermined machining parameters when said guides reach the third straight line portion of said outline.

2. The machining control method of claim 1 wherein an electrical discharge gap is maintained between said workpiece and said wire electrode, and
   the second set of predetermined machining parameters are such that the electrical discharge gap between said workpiece and said wire electrode during the step of the machining when the advance of said wire electrode guides relative to said workpiece is halted is equal to the electrical discharge gap between said workpiece and said wire electrode during the step of the machining when said wire electrode guides are advancing relative to said workpiece along the first straight line portion of said outline.

3. The machining control method of claim 2 wherein, the third set of predetermined machining parameters are such that rate of advance during the step of advancing said wire electrode guides relative to said workpiece along said second straight line portion of said outline is substantially less than the rate of advance during the step of advancing said wire electrode guides relative to said workpiece along the first straight line portion of said outline.

4. The machining control method of claim 3 wherein said wire electrode is bent during said advance by reaction forces in said electrical discharge gap whereby said wire electrode lags behind said wire electrode guides and wherein;
   said step of advancing said wire electrode guides relative to said workpiece along the first straight line portion of said outline further comprises advancing said wire electrode guides relative to said workpiece until said wire electrode guides are positioned at the change of direction point in said outline where said first straight line portion ends and said second straight line portion begins; and
   said step of halting the advance of said wire electrode guides relative to said workpiece further comprises halting the advance of said wire electrode guides at said point in the outline where said first straight line portion ends and said second straight line portion begins and machining said workpiece according to said second set of parameters until said lag is corrected and said wire electrode is positioned at said point in the outline where said first straight line portion ends and said second straight portion begins.

5. The machining control method of claim 4 wherein, after the step of halting the advance of said wire electrode relative to said workpiece;
   initiating said step of advancing the wire electrode guides relative to the workpiece along the second straight line portion of said outline when an electrical discharge does not occur in the electrical discharge gap even when pulse voltages are applied.

6. The machining control method of claim 2 wherein the length of the second straight line portion of said outline is given by the formula:

$$L + (d/2 + G)/\tan(\theta/2)$$

where L is said length of the second straight line portion, d is the wire electrode diameter, g is the length of the electrical discharge gap and $\theta$ is the angle of the change of direction.

7. A position control method for positioning a work table supporting a workpiece relative to a machining tool by means of a control motor comprising:

positioning a plurality of workpieces having varying weights by means of said control motor under varying load conditions of said control motor relative to said machining tool;

measuring the accuracy of said positionings relative to the positionings desired;

computing correction values based on said measured accuracy which is required to be applied to said positionings to correct said positionings to the positions desired, said correction values comprising a distance between the position desired and a position to commence a braking of the control motor;

storing said various weights of workpieces and load conditions and said correction values corresponding to said weights and load conditions;

supporting a workpiece to be machined on said work table;

determining the weight of said workpiece to be machined and the load on the control motor during positioning of said workpiece to be machined;

comparing the weight of said workpiece to be machined and the load on the control motor during positioning of said workpiece to be machined with said stored weights and loads to select the appropriate correction value and to determine a position to commence braking of the control motor for positioning of said workpiece to be machined; and positioning said workpiece to be machined to a position corrected by the determined correction value by commencing a braking of the control motor at the determined position.

8. The position control method of claim 7 in which the control motor positions the work table.

9. The position control method of claim 7 in which the control motor positions the machining tool.

10. The position control method of claim 7 in which the machining tool is a electrical discharge machine tool.

* * * * *